United States Patent
Agrawal et al.

(10) Patent No.: US 7,907,535 B2
(45) Date of Patent: Mar. 15, 2011

(54) ANOMALY DETECTION AND DIAGNOSIS USING PASSIVE MONITORING

(75) Inventors: Shipra Agrawal, Stanford, CA (US); K. V. M. Naidu, Bangalore (IN); Rajeev Rastogi, Bangalore (IN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 504 days.

(21) Appl. No.: 11/944,921

(22) Filed: Nov. 26, 2007

(65) Prior Publication Data

US 2009/0135727 A1    May 28, 2009

(51) Int. Cl.
G01R 31/08 (2006.01)
G06F 153/173 (2006.01)
G06F 11/00 (2006.01)

(52) U.S. Cl. .................. 370/242; 709/224; 714/100

(58) Field of Classification Search ................ 370/241, 370/242, 243, 244, 245, 248, 250, 252, 254, 370/255, 256; 709/223, 224, 226
See application file for complete search history.

(56) References Cited

U.S. PATENT DOCUMENTS

| | | | | |
|---|---|---|---|---|
| 5,995,485 A * | 11/1999 | Croslin | | 370/216 |
| 6,597,658 B1 * | 7/2003 | Simmons | | 370/221 |
| 6,912,203 B1 * | 6/2005 | Jain et al. | | 370/252 |
| 7,577,099 B1 * | 8/2009 | Greenberg et al. | | 370/242 |
| 2003/0043755 A1 * | 3/2003 | Mitchell | | 370/252 |
| 2003/0214913 A1 * | 11/2003 | Kan et al. | | 370/252 |
| 2005/0169185 A1 * | 8/2005 | Qiu et al. | | 370/241 |
| 2005/0265241 A1 * | 12/2005 | Makowski et al. | | 370/241 |
| 2006/0126495 A1 * | 6/2006 | Guichard et al. | | 370/216 |
| 2007/0177518 A1 * | 8/2007 | Li et al. | | 370/252 |
| 2008/0049628 A1 * | 2/2008 | Bugenhagen | | 370/244 |
| 2008/0225739 A1 * | 9/2008 | Toomey et al. | | 370/252 |
| 2009/0161560 A1 * | 6/2009 | He et al. | | 370/242 |
| 2010/0097943 A1 * | 4/2010 | D'Souza et al. | | 370/248 |
| 2010/0208595 A1 * | 8/2010 | Zhao et al. | | 370/242 |

OTHER PUBLICATIONS

Agrawal, S. et al, "VoIP service quality monitoring using active probes," Bell Laboratories, Lucent Technologies, Bangalore India, Presented at Comsware 2006, Jan. 8-12, 2006, New Delhi, India IEEE 2006.

Agrawal, S. et al, "VoIP service quality monitoring using active and passive probes," Presented Jan. 8-12, 2006, Comsware 2006; Proceedings of the First International Conference on COMmunication System softWAre and MiddlewaRE (COMSWARE 2006), Jan. 8-12, 2006, New Delhi, India. IEEE 2006.

* cited by examiner

*Primary Examiner* — Chi H Pham
*Assistant Examiner* — Warner Wong
(74) *Attorney, Agent, or Firm* — Carlson, Gaskey & Olds, P.C.

(57) ABSTRACT

A system and method for determining optimal selection of paths for passively monitoring a communications network. A diagnostic set of paths is determined by ensuring that, for all pairs of links in the network, the set contains one path having only one member of that pair. A detection subset of paths is determined by ensuring that, for all the links in the network, one member of the subset contains that link. Selecting a minimum detection and diagnostic set of paths minimizes the communication overhead imposed by monitoring. During normal operation, only the detection subset need be monitored. Once an anomaly is detected, the system may switch to monitoring the full diagnostic set. The cost of deploying and operating the passive monitoring equipment is minimized by determining the minimum set of links on which a probe needs to be placed in order to monitor the diagnostic set of paths.

16 Claims, 2 Drawing Sheets

CASE 1

CASE 2

CASE 3

CASE 4

ANOMALY DETECTION AND DIAGNOSIS USING PASSIVE MONITORING

FIELD OF THE INVENTION

The present invention relates to systems and methods for monitoring service on communications networks, and particularly to systems and methods that cause minimal disruption to the communications network traffic by using passive monitoring of network traffic data packets.

BACKGROUND OF THE INVENTION

Internet Service Providers (ISPs) are highly desirous of providing Internet Protocol (IP) services, such as Voice over IP (VoIP) and IPTV, to their customers. In order to provide these high value services, the ISP networks need to provide a high Quality of Service (QoS) even as their networks become more complex. There is, therefore, an increased demand for sophisticated monitoring tools that allow the ISPs to rapidly identify degradation in their networks performance and quickly isolate the root cause of any problems. Such tools are critical for ensuring QoS guarantees and for reducing service downtimes through timely resolution of network problems. These monitoring tools typically monitor network traffic parameters such as delay and packet loss using either active or passive measurements.

Active monitoring tools typically inject data packets into the network, or send data packets to applications, in order to obtain measurements of delays or losses.

Passive monitoring devices, in contrast, snoop on existing data-packets as they traverse the network lines as normal network traffic. Passive monitoring has the advantage that it does not increase the traffic in the network. This can be critical when a network interface or link becomes congested. During such times, injecting additional traffic into the network for active measurements may exacerbate the very problem that is being diagnosed. The disadvantages of passive measurements, however, include having less control over the measurement process as only existing network traffic is used and that the amount of data that needs to be collected can be enormous.

In order to control the costs of a passive monitoring infrastructure and the communication overhead between the monitors and the Network Operations Center (NOC), it is important to carefully select the locations at which passive monitoring probes are placed and the paths they are used to monitor. At the same time, it is important to ensure that the data collected by the monitoring probes is sufficient to provide a comprehensive and timely overview of the network's performance. In particular, it is important to provide enough passive monitoring locations that both a detection set of paths and a diagnostic set of paths can be monitored. A detection set of paths for passive monitoring of a communications network is the minimum set of paths that need to be monitored in order to detect that there is an anomaly somewhere in the network. A diagnostic set of paths is the minimum set of paths that need to be monitored in order to accurately locate and diagnose any anomaly that occurs anywhere in the network.

SUMMARY OF THE INVENTION

Briefly described, the invention provides a system and method for determining the optimal selection of paths for passively monitoring a communications network in order to detect and diagnose faults, and the optimal location for placing monitoring probes on the network to be able to monitor those paths.

In a preferred embodiment of the invention, a diagnostic set of paths, or a close approximation to it, is determined by ensuring that, for all pairs of links in the network, the diagnostic set of paths contains at least one path having only one member of that pair of links.

In a preferred embodiment of the invention, a detection set of paths that is a subset of the diagnostic set of paths is determined by ensuring that, for all the links in the communications network, there is at least one member of the detection subset of paths that contains that link.

During normal operation of the network, only the detection subset of paths needs to be monitored, reducing the amount of data that needs to be collected and reported to a network central control. Once an anomaly is detected, the system may switch to monitoring the full diagnostic set of paths so that the anomaly can be fully diagnosed.

The cost of deploying and operating the passive monitoring equipment is minimized by determining a probe location set of links in the communications network. This is the minimum set of links on which a probe needs to be placed in order to monitor the diagnostic set of paths. As the detection set of paths is a subset of the diagnostic set of paths, they will also be monitored by the probe place on the probe location set of links.

These and other features of the invention will be more fully understood by references to the following drawings.

DETAILED DESCRIPTION

Figure 1:
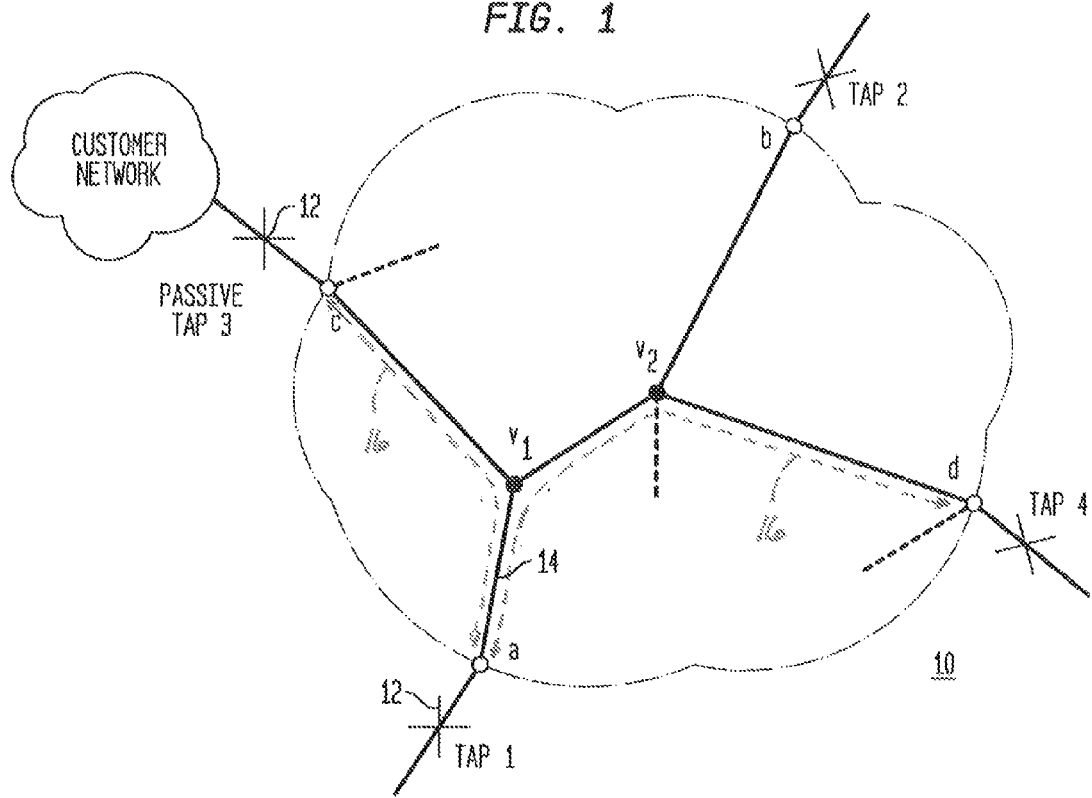
FIG. 1 is a schematic representation of a simple service provider network.

The present invention provides low-cost, low impact solutions for communications network monitoring infrastructures. In such systems, link level anomalies, such as excessive loss or delay of data packets traversing the network, are inferred from path-level passive measurements, i.e., network faults are monitored by observing the normal traffic flowing across the network. Such monitoring may be performed by placing and operating sophisticated monitoring tools at all nodes in the networks. This simple approach, however, is very costly. In order to reduce the cost, the method of this invention determines the optimum location of data monitoring probes on the network in order to minimize the number of data monitoring probes needed while ensuring that any anomaly that occurs anywhere in the network can be fully diagnosed.

Communications networks may be modeled as directed graphs G (V, E) having vertices V and edges E. In such a model, a node v that is an element of V may represent a network router, a switch or a gateway, while the edges of the graph may represent communications links connecting the nodes. A directed communication from a node u to a node v may then be represented by <u, v> and the corresponding undirected physical link by {u, v}. As most modern networks are full-duplex networks, for every directed edge <$u_i$, $v_j$>∈E, there is a directed edge <$v_j$, $u_i$>∈E.

Many Wide Area Networks (WAN) provided by, for instance, Service Providers have a general mesh topology with multiple paths between nodes in order to provide redundant paths. In enterprise environments, however, networks such as Ethernet frames are generally deployed using tree topologies, as they are simpler to implement and are more cost effective.

All Internet Protocol (IP) packets in a typical Service Provider communications network originate and terminate at edge routers that interface with customer networks or other service provider networks, and are represented in a graph model of the network by edge nodes that are a subset of nodes from the set V. In an enterprise network, edge nodes may be client hosts or application servers such as web servers or mail servers. The IP traffic between a pair of nodes traverses the network through a sequence of nodes and links dictated by the network topology and routing protocol. For instance, in a Service Provider network, the communication path between a pair of edge nodes may either be a pre-configured Multiprotocol Label Switching (MPLS) or the shortest path between nodes computed used the Open Shortest Path First (OSPF). In a tree topology network the communication path between an edge node pair is unique and traces the edges of the spanning tree.

In the graph model of the network, the set of paths between edge nodes are denoted by the set P that has members p, and where each p that is an element of P is a sequence of directed links that the path traverses. For simplicity, we assume that routing is symmetric, i.e., for every path p, there is a path $\tilde{p}$ that is an element of P in the opposite direction. However, the schemes discussed in this paper are applicable even if the routing paths are asymmetric. Because passive monitoring relies on observing IP packets traversing the network to detect anomalies, paths with no traffic are not typically included in the set P.

In most commercially available routers, data packets get delayed or lost primarily due to queuing at the transmitting or outbound interfaces. Thus, a loss or delay on a directed communication link <$v_i$, $v_j$> can usually be traced back to the outbound interface $v_i$. Hence, a one-to-one correspondence between the link <$v_i$, $v_j$> and the outbound interface $v_i$ may be assumed for the purpose of anomaly detection.

A passive monitoring infrastructure consists of a set of passive monitoring devices placed at various points in the network where they passively analyze the traffic that passes by. Various devices are available to do the observing. Most commercial routers or switches, for instance, support port mirroring in which each incoming and outgoing packet from one port of the network switch can be copied to another port where the copy of the packet can be studied. There are also hardware devices known as network taps that hook directly into a network cable and send a copy of the traffic that passes through it to one or more other networked devices. A network tap placed on a link between two nodes can measure both forward and reverse traffic on the link and is effectively measuring the incoming and outgoing traffic on the ports at the endpoints of the link. The measurements made by port mirroring and network taps are, therefore, logically equivalent. Passive monitoring devices may include the port mirrors or network taps and any associated local processing device for storing and/or forwarding the information gathered.

FIG. 1 is a schematic representation of a simple service provider network 10, having four passive monitoring devices 12, five links 14 and twelve possible paths 16 that can be passively monitored if they contain data. For simplicity, FIG. 1 shows only two of the paths 16. The paths 16 may be represented as <a, $v_1$, $v_2$, b>, <a, $v_1$, $v_2$, c>, <a, $v_1$, $v_2$, d>, <b, $v_2$, $v_1$, c>, <b, $v_2$, d>, <a, $v_1$, c> and their inverses. In providing a passive monitoring infrastructure for the service provider network 10, an objective is to minimize costs by deploying as few passive monitoring devices 12 as possible that will allow the accurate detection and diagnosis of all single link anomalies. In doing this placement, the assumption is that a path reports an anomaly if and only if it contains a link with an anomaly, and that each network anomaly is caused by a single link.

The anomalies to be monitored include data packet losses and data packet delays. Excessive data packet losses may be detected by, for instance, using passive monitoring devices tap 1 and tap 2 to monitor the data packets traversing the network via the path p1 represented by <a, v1, v2, b>. At regular intervals, e.g., 1, 10 or 30 seconds, both tap 1 and tap 2 send to a central Network Operations Center (NOC) the number of packets seen on path p1 in the most recent time interval. If the difference between the packet counts by tap 1 and tap 2 exceeds a certain pre-specified threshold even after accounting for packets still in transit along the path, then the NOC may conclude that an excessive amount of packets are being lost along some links of the path p. Alternately, the passive monitoring devices tap 1 and tap 2 may send samples of the observed packets on path p1 to the NOC, and an inference of excessive losses on path p can be made if there is a large discrepancy in the samples from the two passive monitoring devices (also known as probes). Similarly, by associating timestamps with the data packets, it is possible to detect excessive delays along path p by keeping track at the NOC of the difference between packet timestamps averaged over an interval or for sample packets.

If an anomaly is reported on path p1, additional paths may be monitored in order to determine in which of the links <a, v1>, <v1, v2> or <v2, b> the anomaly has occurred. Assuming that a path reports an anomaly if and only if it contains a link with an anomaly and that the network anomaly is caused by a single link (representing an interface), it is possible to show that a set of monitored paths Q is sufficient to diagnose which is the anomalous link if, for every pair of links (e1, e2) in the set E of the graph G(V, E) representing the network, there is at least one monitored path in Q that contains exactly one of the two links.

Probe Placement

The probe placement problem solved by the method of this invention may be stated formally along the following lines. Given a directed graph, G=(V, E) and a set of paths P between edge nodes in V, let L represent the set of directed edge-pairs which cannot be distinguished by paths in P. Select the smallest number of undirected edges F on which to place probes so that every link pair in L is distinguished by some edge in F.

If each potential probe location edge F is represented by the subset LF of link pairs L that a probe on F will distinguish, then the problem becomes selecting the smallest number of subsets LF that contain all of L, i.e., the union of all selected subsets LF is L. The probe placement problem is, therefore, reduced to a classic Set Cover optimization problem.

Given a universe U and a collection of subsets S of U, a set cover is the sub-collection C of the subsets S whose union is U, i.e., a set cover is the sub-collection C that contains all the elements of U. Set Cover optimization comprises finding the smallest sub-collection C that is a set cover.

It is well-known that the Set Cover problem is Non-deterministic Polynomial-time (NP) complete, and the optimization version of set cover is NP hard.

It is also well-known that that the greedy algorithm is the best-possible polynomial time approximation algorithm for set cover under plausible complexity assumptions. The greedy algorithm for set cover chooses sets according to one rule: at each stage, choose the set which contains the largest number of uncovered elements.

For a mesh topology network, the minimum number of probe locations needed for passive monitoring of the network can, therefore, be found by the following greedy algorithm for optimal probe placement:

1. Represent the network as a directed graph G=(V, E);
2. Determine P, the set of paths between edge nodes in V;
3. Determine L, the set of directed edge-pairs which cannot be distinguished by paths in P;
4. Determine F, the set of undirected edges available to have probes placed on them;
5. Represent each member of F by the subset LF of link pairs L that a probe on F will distinguish;
6. Select F corresponding to the largest subset $L_F$; and
7. Repeat 2 to 6 with P now including all new paths made possible by selecting F until L=0.

For tree topology networks, an alternate algorithm can be used to find near optimal probe location. This more restricted problem can be shown to correspond to finding an optimal vertex cover. As vertex cover is known to be NP complete and, therefore, there is unlikely to be an efficient algorithm to solve it. A lazy placement algorithm embodiment of this invention can, however, be shown to be a 3-approximation of the optimal solution, i.e., if the algorithm of this invention produces placement of F probes, and the optimal solution is O probes, $|F| \leq 3|O|$.

The lazy placement algorithm proceeds bottom up in a tree topology and uses a lazy probe placement strategy, i.e., a link is only selected for placement if it distinguishes a link that cannot be distinguished further up in the tree.

TABLE 1

Lazy placement algorithm for solving the probe placement
problem in a tree topology network Initially set the solution F(O) = { }, and the set of
undistinguished link pairs L(0) = L;
for i = 1 to |V| do
   Given the set L(i − 1), make local decision for child
   edges of $n_i$;
   Add the selected edges to the solution F(i);
   Remove the link pairs distinguished by F(i) from
   L(i − 1) to get L(i);
end In a preferred embodiment of the invention, the algorithm proceeds as follows:

Chose a root node;

Then proceed bottom up the tree, i.e., before processing any node, process all the node's children;

For each node, decide whether to select the child nodes for probe placement, where a child node for node n denotes the edges connecting a node n to its direct children, child(n)={$c_1$, $c_2$, ... $c_m$}. A probe on any edge in a tree topology can distinguish a directed link pair if and only if the two links are on either side of it. A child edge {n, $c_j$} of n, therefore, can only distinguish an undistinguished link pair if one of the two directed links in the pair is in the subtree rooted at $c_j$ or on {n, $c_j$} and the other is outside the subtree or on {n, $c_j$}.

Furthermore, such a link pair is characterized as being a "ripe link", i.e., a link pair that cannot be distinguished further up the tree if it satisfies one of the four cases illustrated in FIG. 2A, 2B, 2C or 2D.

Figure 2A:
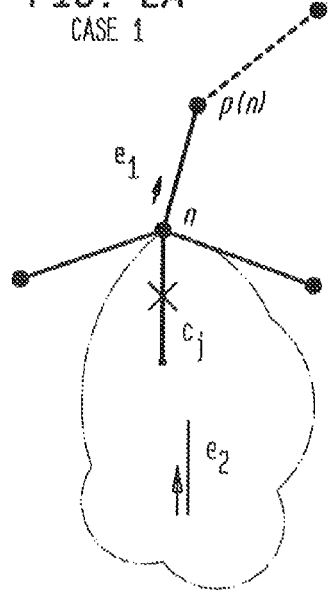
FIG. 2A is a schematic representation of a first case of a node in a tree topology having an edge on which a probe can be placed to distinguish an undistinguished edge pair.

FIG. 2A shows the case in which one, upwardly directed link $e_2$ is either in the subtree rooted at the child node $c_j$ or is <$c_j$ n,> and the other upwardly directed link $e_1$ is on the edge connecting n to its parent.

Figure 2B:
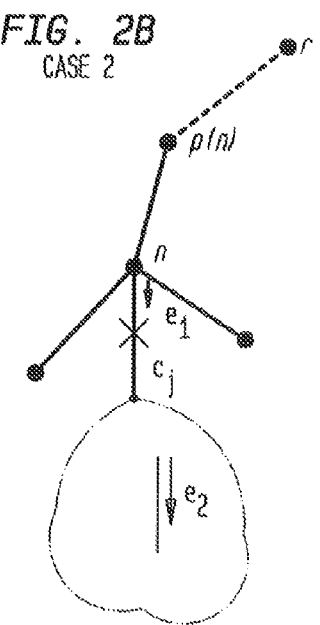
FIG. 2B is a schematic representation of a second case of a node in a tree topology having an edge on which a probe can be placed to distinguish an undistinguished edge pair.

FIG. 2B shows the case in which one, downwardly directed link $e_2$ is in the subtree rooted at the child node $c_j$ o and the other downwardly directed link $e_1$ is on the link <n, $c_j$>.

Figure 2C:
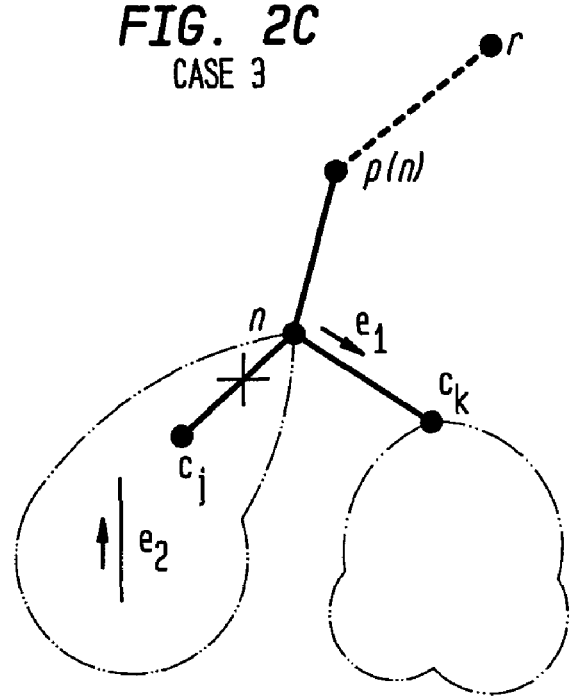
FIG. 2C is a schematic representation of a third case of a node in a tree topology having an edge on which a probe can be placed to distinguish an undistinguished edge pair.

FIG. 2C shows the case in which one, upwardly directed link $e_2$ is either in the subtree rooted at the child node $c_j$ or is <$c_j$ n,> and the other downwardly directed link $e_1$ is on the edge connecting n to another child.

Figure 2D:
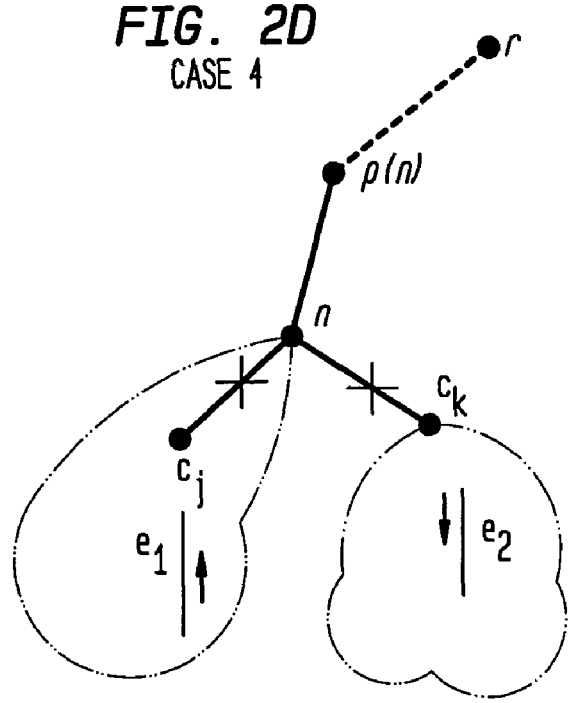
FIG. 2D is a schematic representation of a fourth case of a node in a tree topology having an edge on which a probe can be placed to distinguish an undistinguished edge pair.

FIG. 2D shows the case in which one, upwardly directed link $e_1$ is either in the subtree rooted at the child node $c_j$ or is <$c_j$ n,> and the other downwardly directed link $e_2$ is in a subtree of another child of n.

In the cases represented by FIGS. 2A, 2B and 2C, the probe is placed on the child edge {n, $c_j$}. In the case represented by 2D the probe may be placed on either of the two child edges involved, {n, $c_j$} or {n, $c_k$}.

The lazy placement algorithm of table 1 ensures that at each step all the ripe pairs in L are distinguished. Each time an edge is added to F, the probe placement solution set, all the link pairs distinguished by it are removed from L.

If, from the remaining child edges of n, the subset of child edges which distinguish one or more undistinguished link pairs from L under the case of FIG. 2D can be represented by a set C and the set of those case of FIG. 2D link pairs from L can be represented by a set S. As each pair in S can be distinguished by two child edges, {n, $c_j$} or {n, $c_k$}, the problem of selecting the minimum subset of C such that all the link pairs in S are distinguished can be reduced to the Set Cover problem instance (S, C) with each element belonging to exactly two sets, which is the definition of a Vertex Cover. A Vertex Cover of an undirected graph G=(V,E) is a subset V' of the vertices of the graph which contains at least one of the two endpoints of each edge.

The well known 2-approximation algorithm for Vertex Cover can be used to find a subset of C which distinguishes all the link pairs in S and add the subset to the solution F. The factor-2 approximation algorithm is to repeatedly take both endpoints of an edge into the vertex cover, then remove them from the graph. No better constant-factor approximation is known.

Path Selection for Anomaly Detection

The problem of path detection for anomaly detection can be stated formally as follows. Given a directed graph G=(V, E) and a set of paths P' that can be monitored by passive probes, select the minimum subset of paths $Q_{det}$ such that every directed link in E belongs to at least one path in $Q_{det}$. This may be termed the path cover problem.

In a mesh topology, a the path cover problem can be shown to be equivalent to the set cover problem. The greedy algorithm for set cover can, therefore, be used as a logarithmic approximation algorithm for selecting a minimum subset of paths to cover all the directed links. As described above, the greedy algorithm chooses sets according to one rule: at each stage, choose the set which contains the largest number of uncovered elements.

In a tree-topology network, a 2-approximation to the optimal path cover in the network is possible. The method consists of selecting a root, then, from each leaf node of the tree, selecting the path that comes closest to the root. Both directions of the path are then included in the solution set. If there are n leaf node vertices, clearly at least n paths are needed to completely cover all the directed links in the network. This is because each path can cover at most two directed links from those incident on the leaf nodes: the link directed from the leaf node at which the path starts to an inner node and the link directed from an inner node to the leaf node at which the path terminates. Thus at least n paths are required to cover the 2n directed links on n leaf nodes. Our solution has 2n paths and so is at least a 2-approximation. If a link is covered by a path, then from one of the leaf nodes serving as endpoints of the path, the link will be on the path from the leaf node to the root, so the link will be covered by the closest path to the root from that leaf node. Therefore, all the links in the tree will be covered by the selected paths. By including both the forward and reverse paths in the solution set, all the directed links will be covered.

Path Selection for Anomaly Diagnosis

A set of paths Q is sufficient to diagnose an anomalous link, if, for every pair of links $(e_1, e_2)$ in E, there is at least one path in Q that contains exactly one of the two links. Such a path is said to distinguish between the links $e_1$ and $e_2$. Given a network defined as a directed graph G=(V, E) and a set of paths P' that can be monitored by passive probes, path selection for anomaly diagnosis requires finding the minimum set of paths Q that distinguish all link pairs in E and is a subset of P'.

For mesh graph topologies, the anomaly diagnosis problem can be reduced to a set cover problem by reducing each link pair to an element and each path to the set of link pairs it distinguishes. As noted above, a path distinguishes all the links it contains from all the links it does not contain. In this reduction, $p=\{e_1, e_2\} \in P$, where $e_1, e_2 \in E$ is reduced to the set $\{(e_1, e_j) | e_j \in E, e_j \notin p\} \cup \{(e_2, e_j) | e_j \in E, e_j \notin p\}$. The greedy algorithm for set cover can then be used to give a logarithmic factor approximation algorithm to compute a subcollection of paths that distinguishes all the link pairs. In the greedy algorithm, sets are chosen according to one rule: at each stage, choose the set which contains the largest number of uncovered elements.

For tree topologies, there is a 12-approximation algorithm for solving the anomaly diagnosis problem. Given a tree T having n vertices, with the edges denoted by E and where P is the required set of paths, the algorithm proceeds by first obtaining a solution in each undirected edge of the tree. Once a diagnosis path set is obtained for an undirected tree network, each path in the solution can be replaced by the corresponding directed paths in both directions in order to differentiate any two directed links. A diagnosis path set should be at least a constant fraction of the number of vertices n in the tree network. Such a diagnosis path set whose size is a constant times n may be chosen as follows:

Let the optimal diagnosis path set be $D_o$, a solution be DC and an undirected solution path set D.

First, find the undirected path cover using the 2-approximation algorithm detailed above. In this method a root is selected, then, from each leaf node of the tree, selecting the path that comes closest to the root. For the undirected case, any path cover size is at least $n_1/2$, and the 2-approximation algorithm gives a path cover size of $n_1$ where $n_1$ are the leaf nodes of the tree. Call this undirected path cover set C and make D=C.

Second, for each edge $e=\{u_e, v_e\}$, fix a path $P_e$ in the path cover that covers this edge. Also, denote by $s_e$ and $t_e$ the end points Of $P_e$ and let $s_e$ be the end closer to $u_e$.

Thirdly, each edge $e=\{u, v\}$ divides the path $P_e$ into at most three segments $(s_e, u_e)$, $(u_e, v_e)$ and $(v_e, t_e)$. Among all the paths that pass through e and deviate from $P_e$ in the segment $(s_e, u_e)$, choose the one that deviates at a vertex closest to $u_e$. Call this path $P_{s,e}$. Similarly, choose $P_{t,e}$. If no such path exists, or $u_e$ or $v_e$ are the endpoints, do not choose the corresponding path. Add the chosen paths to D.

The diagnostic path solution set DC can be shown to be a 12-approximation of the optimum solution $D_o$.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

The invention claimed is:

1. A method of passively monitoring a communications network having one or more paths that each includes links so as to detect and diagnose a link anomaly, said method comprising the steps of:
    determining a diagnostic set of paths in said communication network that, for all pairs of said links in said network, contains at least one path having only one link of each said pair of links;
    determining a detection subset of said diagnostic set of paths that, for all said links in said network, every link belongs to at least one path of the detection subset;
    monitoring, using a monitoring device, only said detection subset of said paths; and
    switching from monitoring only said detection subset of paths to monitoring said diagnostic set of paths responsive to detecting the link anomaly.

2. The method of claim 1 wherein said monitoring comprises determining a first count of data packets at a first end of one of said paths, and a second count of data packets at a second end of said path, and wherein said detecting an anomaly comprises detecting whether a difference between said first and second count exceeds a predetermined amount.

3. The method of claim 1 wherein said monitoring comprises recording a first time-stamp of a plurality of data packets at a first end of one of said paths, and a second timestamp at a second end of said path, and wherein detecting an anomaly comprises detecting whether a difference between said first and second timestamp exceeds a predetermined amount.

4. The method of claim 1 comprising determining a probe location set of links in said communications network to enable monitoring said diagnostic set of paths.

5. The method of claim 4 comprising the step of locating a data monitoring probe on each link of said probe location set of links.

6. The method of claim 5 wherein said locating comprises locating a data monitoring probe on each of an edge node interface of said communications network.

7. The method of claim 1 wherein said communications network has a mesh topology and wherein said step of determining a detection subset of paths comprises considering the determination as a set cover problem; and solving said set cover problem using a greedy algorithm.

8. The method of claim 1 wherein said communications network has a mesh topology and wherein said determining a diagnostic set of paths comprises
    reducing the determination to a set cover problem comprising:
        correlating each of said link pairs to an element in a set; and
        correlating each path to the set of link pairs it contains; and
    solving said set cover problem using a greedy algorithm.

9. The method of claim 4 wherein said communications network has a mesh topology and wherein said determining a probe location set of links in said communications network to enable monitoring said diagnostic set of paths comprises
reducing the determination to a set cover problem comprising:
correlating each undistinguished directed link pair to an element;
correlating each link to a set of link pairs it can distinguish; and
solving said set cover problem using a greedy algorithm.

10. The method of claim 1 wherein said communications network has a tree topology and wherein said step of determining a detection subset of paths comprises
selecting a root vertex of said tree topology; and
from each leaf node in said tree topology, selecting a path that comes closest to said root vertex.

11. The method of claim 10 wherein said communications network has a tree topology and the method comprises
for each of said links in said communications network,
selecting a first path from said detection subset of paths that contains said link, said path having a near end and a far end,
then selecting a second path from said detection subset of paths that contains said link and deviates from said first path between said near end and another of said links closest to said link,
then selecting a third path from said detection subset of paths that contains said link and deviates from said first path between said far end and said another of said links closest to said link.

12. The method of claim 4 wherein said communications network has a tree topology wherein said step of determining a probe location set of links in said communications network to enable monitoring said diagnostic set of paths comprises using a lazy algorithm comprising the steps of:
selecting a root of said tree topology;
selecting a child link of a node as a member of probe location set of links if a determination is made that said child link can distinguish an undistinguished member of said link pairs that cannot be distinguished by a higher link in said tree; and
repeating said selecting a child link for all child nodes of all nodes of said tree topology, proceeding up from a bottom node of said tree topology.

13. The method of claim 12 wherein said determination that said child link can distinguish an undistinguished member of said link pairs comprises determining that a first of said links is on a subtree of said child link and a second of said links is outside said subtree or on said child link.

14. The method of claim 13 wherein said determination that said link pair cannot be distinguished by a higher link in said tree comprises determining if said link pair belongs to one of a plurality of cases consisting of: a first case in which said second link corresponds to a parent link of said child, a second case in which said second link corresponds to said child link, a third case in which said second link corresponds to a second child link of said node, and a fourth case in which said second link is on a subtree of said second child link of said node.

15. A method of passively monitoring a communications network having one or more paths that each includes links so as to detect and diagnose a link anomaly, comprising the steps of:
determining a diagnostic set of paths in said communication network that, for all pairs of said links in said network, contains at least one path having only one link of each said pair of links;
determining a detection subset of said diagnostic set of paths that, for all said links in said network, every link belongs to at least one path of the detection subset;
monitoring, using a monitoring device, only said detection subset of said paths; and
switching from monitoring only said detection subset of paths to monitoring said diagnostic set of paths responsive to detecting the link anomaly,
wherein determining the diagnostic set comprises
reducing the determination to a set cover problem by correlating each of said link pairs to an element in a set and correlating each path to the set of link pairs it contains; and
solving said set cover problem using a greedy algorithm.

16. A method of passively monitoring a communications network having a tree topology having one or more paths that each includes links so as to detect and diagnose a link anomaly, comprising the steps of:
determining a diagnostic set of paths in said communication network that, for all pairs of said links in said network, contains at least one path having only one link of each said pair of links;
determining a detection subset of said diagnostic set of paths that, for all said links in said network, every link belongs to at least one path of the detection subset;
determining a probe location set of links in said communications network using a lazy algorithm comprising
(i) selecting a root of said tree topology;
(ii) selecting a child link of a node as a member of probe location set of links if a determination is made that said child link can distinguish an undistinguished member of said link pairs that cannot be distinguished by a higher link in said tree; and
(iii) repeating said selecting a child link for all child nodes of all nodes of said tree topology, proceeding up from a bottom node of said tree topology;
monitoring, using a monitoring device, only said detection subset of said paths; and
switching from monitoring only said detection subset of paths to monitoring said diagnostic set of paths responsive to detecting the link anomaly.

* * * * *